Figure 4:
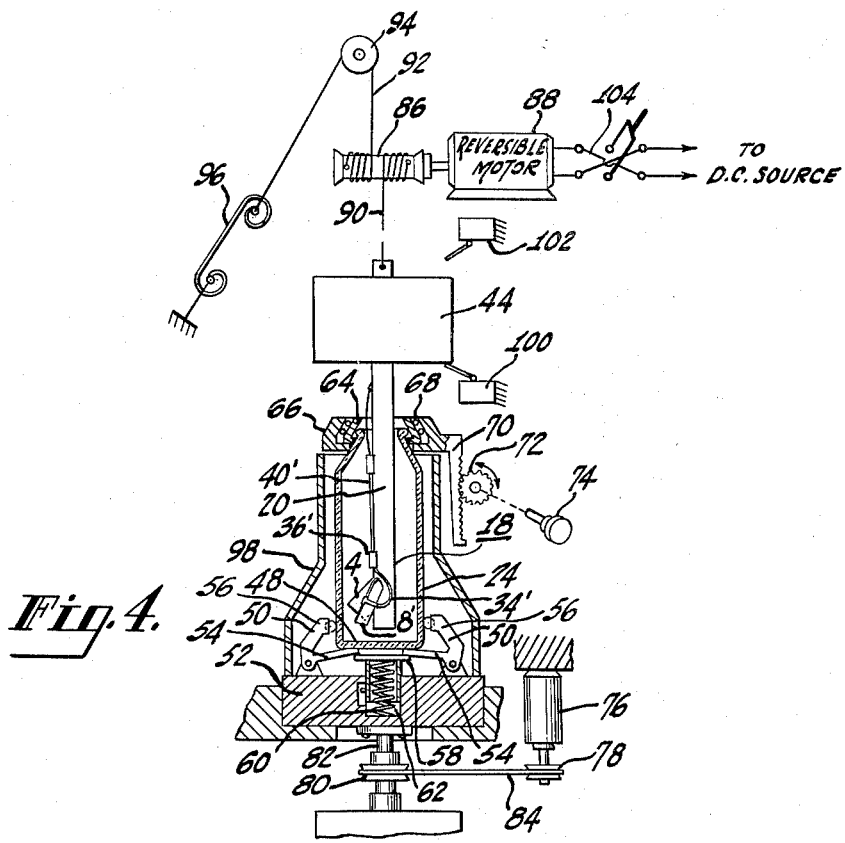

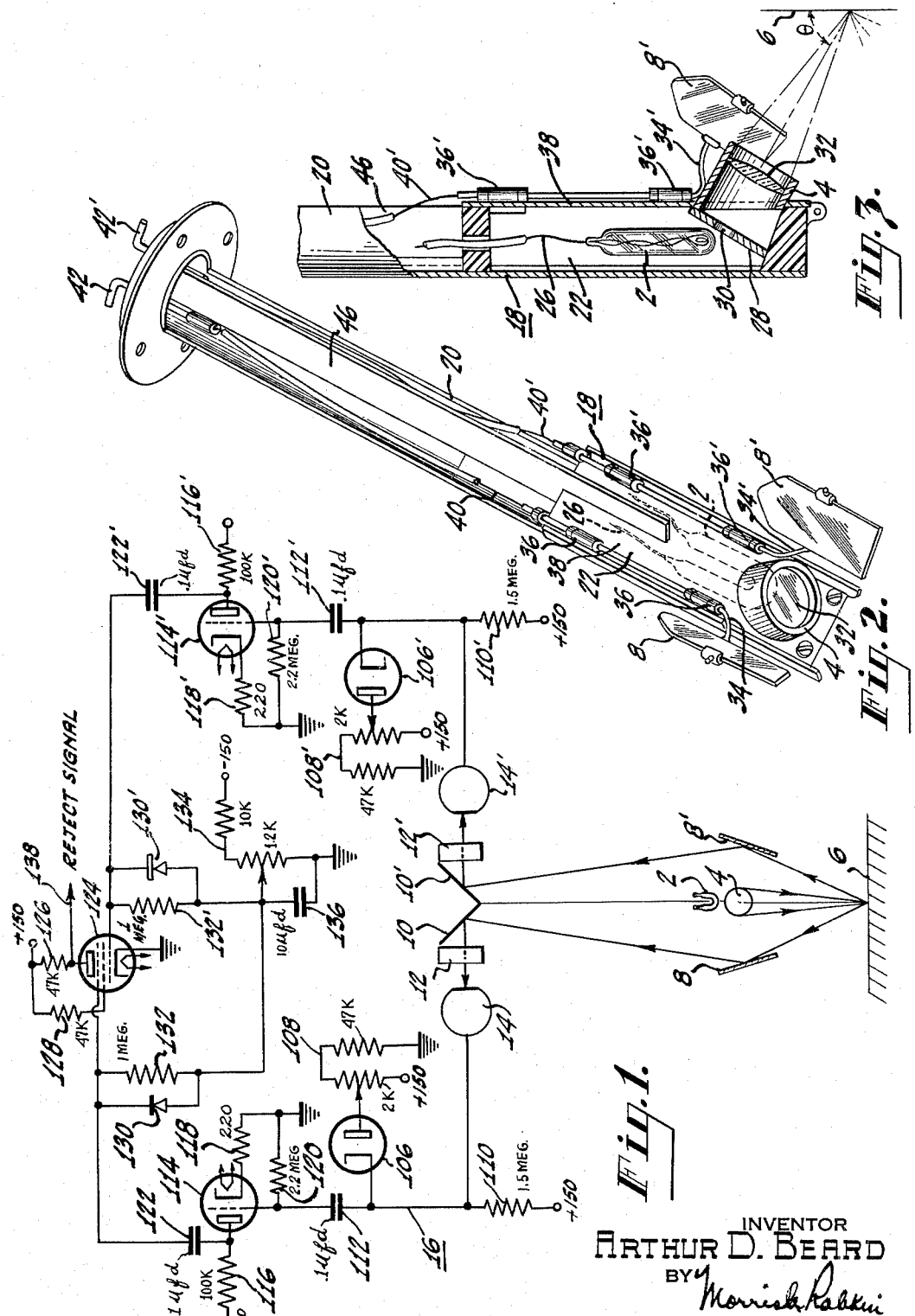

United States Patent Office 2,730,922
Patented Jan. 17, 1956

2,730,922

PHOTOELECTRIC INSPECTION BY A COINCIDENT METHOD

Arthur D. Beard, Haddonfield, N. J., assignor to Radio Corporation of America, a corporation of Delaware Application October 12, 1951, Serial No. 251,089

6 Claims. (Cl. 88—14)

This invention relates to methods and apparatus for inspecting a surface of an article for the presence of foreign matter. More particularly, the invention relates to a photoelectric inspection method and means in which relative motion is effected between the surface being inspected and the longitudinal axis of a spot of light focused thereon, in which the presence of foreign matter is detected by an increase in light diffusely reflected from the surface, and including improved means for discriminating between diffuse and specular reflections received by the detecting means.

The methods and apparatus of the present invention can be used to inspect both flat and curved surfaces but are of particular advantage in the inspection of a curved surface in which the angle of curvature varies widely, as, for example, the interior surface of an empty container.

In a copending application of Arthur D. Beard and Everett Eberhard, Serial No. 212,317, filed February 23, 1951, there has been disclosed a method and apparatus for inspecting the interior surface of an empty container. The invention disclosed in that application includes means for directing a spot of light to the surface being inspected, means for picking up diffuse reflection of the light from the surface, and means for detecting increases in the diffuse reflection as relative movement is effected between the surface being inspected and the light spot. When a beam of light is directed to a relatively smooth surface there is both specular reflection, which is highly directional, and diffuse reflection, which is omnidirectional. Most of the specular reflection occurs at an angle equal to the angle of incidence of the light beam. It has been found that the presence of dirt on a relatively smooth surface will cause a decrease in specular reflection and an increase in diffuse reflection. Since the diffuse reflection is less affected by changes in the angle of incidence of the inspection beam than is specular reflection, the diffuse reflection signals have been utilized to provide the reject signals in the referred to apparatus.

The apparatus disclosed in the copending application functions satisfactorily when used to inspect the interior side walls of empty containers such as glass milk bottles but is not satisfactory for inspecting the sharply curved portion where the side walls merge with the bottom of the bottle. This is due to the fact that as the inspecting spot of light sweeps over this portion of variable curvature, specular reflections are swept through substantially all angles in a vertical plane. And, if the bottle is square, as the light spot travels around the corners, specular reflections occur through substantially all angles in a horizontal plane. Thus, there appears to be no position for a mirror used to pick up the reflected light from which the reject signal is obtained, for which this mirror will not receive some sharp increases in reflected light intensity which are due to specular reflection rather than diffuse reflection. Since the photocell detects increases in light without discriminating between light sources, any increases in light due to reception of specular reflections cause spurious reject signals in the output circuit of the apparatus.

The present invention is an improvement over the apparatus and method described in the above referred to application in that it provides a means and method for inspecting not only the more or less perpendicular side walls of a container but for inspecting satisfactorily that portion of the container where the side walls and bottom merge. In brief, the present invention includes, in addition to means for projecting a beam of energy to a surface, a coincident system for detecting increases in reflected energy. Each half of the system includes suitable mirrors for picking up reflections of the light beam from the surface being inspected, and a photoelectric device. The pick-up mirrors are spaced apart such that they can simultaneously pick up only diffuse reflection. Any specular reflection will strike only one mirror at a time. The outputs of the photocells are coupled to a circuit capable of discriminating between simultaneous increases in output received from both cells and increases in output of only one cell at a time. The simultaneous increases in output are converted into some form of reject signal.

One object of the present invention is to provide an improved method of photoelectrically inspecting a surface having varying degrees of curvature.

Another object of the invention is to provide an improved method of inspecting the interior surfaces of containers for the presence of foreign matter.

Another object of the invention is to provide an improved method of photoelectrically inspecting a surface of any type for the presence of foreign matter.

Another object of the invention is to provide an improved method of discriminating between diffuse reflection and specular reflection of a beam of light directed upon a surface.

Another object of the invention is to provide an improved apparatus for photoelectrically inspecting a surface for the presence of foreign matter.

Another object of the invention is to provide an improved apparatus for inspecting surfaces having widely varying degrees of curvature.

Another object of the invention is to provide improved apparatus for inspecting the interiors of containers.

Another object of the invention is to provide improved apparatus for utilizing diffuse reflection in inspecting a surface for the presence of foreign matter.

Still another object of the invention is to provide improved inspection apparatus including means for discriminating between diffuse and specular reflections.

These and other objects will be more apparent and the invention will be more readily understood from the following detail description and the illustrative drawings of which:

Figure 1 is a schematic diagram of one embodiment of a system in accordance with the present invention, Figure 2 is a front perspective view of an inspection head embodying principles of the present invention, Figure 3 is a side elevation view, partly in section and partly broken away, of the apparatus of Figure 2, and Figure 4 is a side elevation view, partly in section, showing an inspection head, as shown in Figures 2 and 3, incorporated in one form of scanning apparatus proposed heretofore, but which may be utilized with apparatus of the present invention.

Referring now to Figure 1, apparatus embodying principles of the present invention includes a source of radiant energy 2 which may be a miniature low pressure mercury arc lamp having 90% of its radiation in the ultraviolet at 2537 A. The source of radiant energy may also be a small incandescent lamp. Also included may be some form of optical system 4 for focussing the radiant energy upon the surface 6 which is being inspected.

Means for picking up diffuse reflection of the beam of energy from the surface 6 may comprise two mirrors 8 and 8'. Light from the mirrors is reflected to other mirrors 10 and 10' respectively from where it is directed through filters 12 and 12' to photocells 14 and 14'. For some light sources and photocells used in combination, the light filters may be omitted.

The outputs of both of the photocells are then fed to a discriminator circuit 16 which discriminates between increases in light picked up simultaneously by both of the pick-up mirrors 8 and 8' and light increases picked up by only one of these mirrors at a time. The structure and operation of the discriminator circuit will be described in more detail later.

The output of the discriminator circuit is then fed to some form of indicating device (not shown) which may be entirely conventional in nature.

A particular form of inspection head for use in the present invention will now be described. Referring to Figures 2 and 3, a suitable inspection head 18 comprises an elongated support member 20 provided adjacent its lower end with a housing 22 within which is mounted the lamp 2. The entire inspection head is intended to be inserted down inside a container 24 being inspected, as shown in Figure 4. The lamp 2 is provided with suitable lead wires 26 extending upward to the top of the support member 20 and to a source of current (not shown).

The lower wall 28 of the lamp housing is set at an angle to the perpendicular and is provided with an aperture 30 through which light rays from the lamp may emerge. Aligned with the aperture is a lens 32 mounted so as to direct the light rays emerging from the aperture at an acute angle below the horizontal and so arranged to focus the light rays in a small spot upon the surface being inspected. The strength and positioning of the lens with respect to the aperture will, of course, be dependent upon the distance to the surface being inspected.

Mounted one on either side of the central axis of the light beam emerging from the lens are the two small mirrors 8 and 8'. These mirrors are mounted at about the same general level as the lens. These mirrors are turned at an angle toward each other and are also tilted from the vertical so as to direct light upward in a substantially vertical direction.

The function of the mirrors is to pick up light diffusely reflected from the surface 6 being inspected. Since it is desired to have these mirrors pick up as little specular reflection as possible they are positioned such that most of the specular reflections will not reach them. From the illustration of Figure 3 it will be apparent how this is accomplished. Most specular reflection occurs within a narrow range of angles on either side of an angle of reflection which is equal to the angle of incidence. Since the light, in this embodiment of apparatus, is directed at a downward angle, the specularly reflected light will also be directed downward and away from the mirrors as shown. This condition will be present when the surface being inspected is substantially vertical or, at least, when the upper angle $\theta$ between the surface and the axis of the beam is an acute angle.

However, when the inspection beam moves over a surface curved in the vertical direction, the angle of specular reflection sweeps through a range of angles depending upon the curvature of the surface being inspected, and may thus strike one or the other of the mirrors for brief periods during the inspection process.

The mirrors 8 and 8' are each mounted on rotatable arms 34 and 34'. These arms are mounted in bearings 36 and 36' which are, in turn, mounted on the outer surface of the front wall 38 of the lamp housing 22. The arms 34 and 34' are connected through flexible wire cables 40 and 40' to handles 42 and 42' mounted adjacent the upper edge of the elongated support member 20 so that the positions of the mirrors may be manually adjusted to the optimum for the type of surface being inspected.

Another reason for including means for adjusting the positions of the mirrors is that when the apparatus is used to inspect containers with narrow necks, the mirrors may have to be swung inward toward each other as the inspection head is moved through the neck, in order to prevent the mirrors from striking the walls.

As shown in Figure 1, light from the mirrors 8 and 8' is reflected up to mirrors 10 and 10' and thence through light filters 12 and 12' to photocells 14 and 14'. These portions of the apparatus may be mounted within a housing 44, such as shown in Figure 4. In order to separate the light reflected from the mirrors 8 and 8' the elongated frame member 20 is provided with a dividing wall 46 mounted along its midline and extending from the upper end of the member to a line about opposite to the tops of the mirrors 8 and 8'. The sides of this wall may be of light reflecting material in order to direct most of the light to the top of the inspection head.

In order to inspect a given surface area it is necessary to effect relative movement between the light spot and the surface upon which the spot is focussed. This may be done by moving either the inspection head, the article being inspected, or both. Means for accomplishing this have been fully disclosed in the previously mentioned application Serial No. 212,317 and are not a part of the present invention. For convenience of reference, however, one of the suitable forms of apparatus disclosed in the previous application will be also described here.

Where the interior of a bottle is being inspected, the bottom of the bottle 48 may be held in clamping means comprising L-shaped toggle clamps 50 pivotally mounted on a turntable 52. These clamps have horizontally extending arms 54 and vertically extending arms 56. The clamps are mounted so that they open toward each other and so that the free end of each of their horizontal arms rests on a spring-supported disc 58. The spring 60 supporting this disc is mounted within a recessed opening 62 in the center of the turntable.

The neck of the bottle is held by a combination of a rotatable retainer ring 64 of frusto-conical shape, which slips over the neck of the bottle, stationary outer ring 66 also of frusto-conical shape, and a bearing 68 between the two rings. A rack 70 connected to the outer ring 66 and pinion gear 72 are also provided for raising and lowering the neck holder over the neck of the bottle.

The upper end of the bottle is both held and centered by lowering the retainer ring down over the neck as far as it will go. This is accomplished by rotating a knob 74 which turns a shaft connected to the pinion gear 72. The knob, shaft, and pinion gear are mounted on the stationary framework of the apparatus in any suitable manner (not shown).

With the bottle positioned on the turntable, a drive motor 76 may be actuated by manual operation of a switch (not shown). The motor drives the turntable through a pulley 78 mounted on the motor shaft, a pulley 80 mounted on a shaft 82 extending from the center of the lower face of the turntable 52, and a drive belt 84.

As the bottle is rotated, the scanning head is lowered and raised by additional mechanism that will now be described. This mechanism may comprise a drum 86, a reversible motor 88 having a shaft connected to the drum for rotation thereof, a cord or chain 90 for suspending the inspection mechanism from the drum, and a tensioning device. The tensioning device may include a cord 92 wound around the drum in a direction opposite to that of the cord 90, a suspending pulley 94, and a tensioning spring 96 having one end connected to the cord 92 and the other end anchored.

The bottle may also be provided with an opaque light shield 98.

Operation of the scanning mechanism is as follows. Drive motor 76 is started causing the turntable and the bottle to rotate. The reversible motor 88 is then actuated such that the cord 90 unwinds from the drum 86 and lowers the inspection head within the bottle. The light spot is thus swept in a spiral path over the interior of the side walls of the bottle all the way down to the bottom. Automatic stopping and reversal of the inspecting mechanism may be utilized by means of two microswitches. One of these 100 may be positioned to be actuated by the bottom of the housing 44 when it reaches the lowermost desired point in its path of travel. The other switch 102 may be positioned to be actuated by the top of the housing when it has reached its uppermost desired position. The microswitch 100 may be utilized to throw a reversing switch 104 so that the cord 90 is wound up on the drum. The switch 102 may be utilized to throw the reversing switch to neutral.

As the light beam is swept over the surface of the bottle, the diffuse reflection picked up by the mirrors 8 and 8' usually remains fairly constant as long as the surface being inspected is clean. However, when the light spot is passed over a dirt particle, diffuse reflection is abruptly increased. Since diffuse reflection occurs at almost all angles to the surface, the increase in reflected light will be picked up by both mirrors and directed to the photocells.

The outputs of the photocells are fed to the discriminator circuit 16 illustrated in Figure 1. The photocells 14 and 14' are photomultiplier tubes. They may be RCA type 1P28. The outputs from the collector electrodes of the photomultiplier tubes are limited by diodes 106 and 106' respectively. The limiting level of each of these diodes is selected by means of a potentiometer 108 or 108', one side of which is grounded and the other side of which is connected to a source of +150 volts.

Also connected to the output of each photomultiplier is a collector load impedance 110 or 110' which is series connected to a source of +150 volts. The impedance of the potentiometers 108 and 108' should be made relatively small compared to the load impedances for good limiting action.

The output of each of the photocells is also connected to one side of a coupling capacitor 112 and 112' through which the signals are applied to the grid of a conventional triode tube 114 or 114' used as an amplifier. The anode of each triode is connected through an anode resistor 116 or 116' to a source of +300 volts. Cathodes of the tubes 114 and 114' are biased to ground through cathode resistors 118 and 118' respectively. Grids of these tubes are also connected to ground through grid resistors 120 and 120'.

The amplified signals developed across the anode resistors 116 and 116' of the triode amplifiers are then fed through coupling capacitors 122 and 122' to either the control grid or the suppressor grid of a type 6AS6 pentode 124. The anode of this tube is connected through a resistor 126 to a +150 volt source and the screen grid of the tube is connected through a resistor 128 of similar value to the same source.

In order to maintain the bias levels of the control grid and the suppressor grid of the 6AS6 at the same desired value and also to permit rapid discharge of condensers 122 and 122', crystal diodes 130 and 130' are connected one to each grid, with a resistor 132 or 132' connected in parallel with each diode.

To select the proper operating bias for the control and suppressor grids of the pentode, one electrode of each diode is connected through a common potentiometer 134 to a source of −150 volts. The same side of each diode is also coupled to ground through a common capacitor 136. This capacitor provides a low impedance path to ground and prevents coupling action between the two grids.

Reject signals are obtained through a lead 138 connected to the anode of the pentode tube.

The action of the discriminator circuit described above is as follows. When the inspection beam sweeps across a spot of dirt, diffuse reflection increases, both photocells simultaneously detect an increase in light and corresponding increases occur in the outputs of both cells. These outputs are amplified by the triode amplifier circuits and the amplified signals are fed one each to the suppressor grid and the control grid of the pentode. The suppressor grid and control grid are each biased negatively to such a value that either grid alone is capable of keeping the tube in a non-conducting state. But if simultaneous positive signals are fed to both control and suppressor grids, the tube conducts and a reject signal occurs in the lead 138 connected to the anode of the pentode tube. This reject signal may be utilized in conventional manner either to actuate a visual or audible signal device or to actuate mechanism for automatically rejecting the bottle that has not passed inspection.

Specular reflections picked up by either mirror will generally cause greater increases in detected light than diffuse reflections. When signals due to specularly reflected light occur in the output circuits of either of the photocells, they are limited by the diodes 106 and 106' before being amplified. Since these signals will not occur simultaneously in both of the photocell output circuits, only one of the grids of the pentode tube will be affected at any one time and no output reject signal will occur.

The crystal diodes 130 and 130' are utilized on the grids of the pentode to clamp the signals to the bias level. Otherwise, a low level dirt signal in the presence of a high level specular signal might be driven below the cutoff voltage of the pentode by the averaging effect of the coupling condensers.

What is claimed is:

1. A method of inspecting a surface comprising directing a beam of energy upon said surface whereby said beam is reflected in a specular reflection path and in diffuse reflection path, moving said beam over said surface, deriving separate signals from separate parts of the diffuse reflection of said beam from said surface at a plurality of spaced apart points, and deriving a single output signal only in response to increases in the intensity of diffusely reflected energy that is received simultaneously at said points.

2. In a process of inspecting a normally smooth surface for the presence of foreign matter, the method of discriminating between specular reflections from a clean surface and diffuse reflections from foreign matter from said surface comprising moving a plurality of spaced apart light sensitive pick-up points adjacent said surface whereby only diffuse reflection is received at all of said points, deriving separate electrical signals from the light picked up from said points, limiting the intensity of said electrical signals from said specular reflections, and deriving a single output signal only in response to the presence of the sum of at least two of said separate electrical signals.

3. Apparatus for inspecting a surface comprising means for directing a beam of energy to said surface whereby said beam is reflected in a specular reflection path and in diffuse reflection paths, a plurality of means located at a plurality of spaced apart points respectively for picking up part of said energy reflected from said surface, each of said pick-up means being positioned normal to different ones of said diffuse reflection paths whereby only diffuse reflection is received at all of said pick-up means simultaneously, means for limiting the energy picked up from the specular reflections, and means for discriminating the simultaneously diffusely reflected light from the light reflected in a specular path.

4. Apparatus for inspecting a surface comprising means for directing a beam of light to said surface whereby said beam is reflected in a specular reflection path and in diffuse reflection paths, a pair of mirrors, each of said mirrors being normal to different ones of said diffuse reflection paths whereby only diffuse reflection of said beam is received by both of said mirrors simultaneously, separate photoelectric means positioned to receive reflected light from each of said mirrors, and circuit means responsive to the outputs of said photoelectric means to discriminate the simultaneously diffusely reflected light from the light reflected in a specular path, said circuit means comprising means to limit said outputs in response to specular reflections.

5. Apparatus according to claim 4 including means for changing the angular orientation of said mirrors with respect to said beam.

6. Apparatus for inspecting a surface for the presence of foreign matter comprising means for directing a beam of light to said surface whereby said beam is reflected in a specular path and in diffuse reflection paths, means for effecting motion between the longitudinal axis of said beam and said surface, a pair of mirrors positioned one on either side of said axis normal to different ones of said diffuse reflection paths whereby only diffuse reflection of said beam from said surface reaches both of said mirrors simultaneously, separate photoelectric means positioned to receive light reflected from said mirrors, and a circuit connected to the outputs of said photocells to discriminate the simultaneously diffusely reflected light from the light reflected in a specular path.

References Cited in the file of this patent

UNITED STATES PATENTS

| | | |
|---|---|---|
| 2,132,254 | Becker | Oct. 4, 1938 |
| 2,165,054 | Johnson | July 4, 1939 |
| 2,481,863 | Owens | Sept. 13, 1949 |